United States Patent [19]
Fujisaka et al.

[11] Patent Number: 5,323,162
[45] Date of Patent: Jun. 21, 1994

[54] SYNTHETIC APERTURE RADAR SYSTEM

[75] Inventors: Takahiko Fujisaka; Yoshimasa Oh-Hashi; Michimasa Kondo, all of Kamakura, Japan

[73] Assignee: Mitsubishi Denki Kabushiki Kaisha, Tokyo, Japan

[21] Appl. No.: 125,589

[22] Filed: Sep. 23, 1993

[30] Foreign Application Priority Data

Oct. 7, 1992 [JP] Japan ................... 4-268713

[51] Int. Cl.⁵ .......................... G01S 13/90
[52] U.S. Cl. ...................... 342/25; 342/161
[58] Field of Search ................. 342/25, 161

[56] References Cited

U.S. PATENT DOCUMENTS

| | | | |
|---|---|---|---|
| 4,965,582 | 10/1990 | Hellsten | 342/25 |
| 4,989,008 | 1/1991 | Fujisaka et al. | 342/25 |
| 5,059,966 | 10/1991 | Fujisaka et al. | 342/25 |
| 5,122,803 | 6/1992 | Stann et al. | 342/25 |

OTHER PUBLICATIONS

Donald R. Wehner "High Resolution Radar", 1987.
J. C. Kirk, Jr. "Motion Compensation for Synthetic Aperture Radar IEEE Transactions on Aerospace & Electronic Systems", May 1975.

Primary Examiner—Gilberto Barrón, Jr.
Attorney, Agent, or Firm—Wolf, Greenfield & Sacks

[57] ABSTRACT

A synthetic aperture radar system is mounted in a moving platform. The synthetic aperture radar system includes a multi-beam antenna having a plurality of reception beams different in direction from one another, the multi-beam antenna being adapted to receive radar echoes from objects. The width of each of the reception beams is selected such that the band width of a Doppler shift contained in the radar echo of a moving object is broader than that of a Doppler shift contained in the radar echo of a stationary object. The radar echo is pulse compressed to improve the range resolution before the frequency thereof is shifted such that the center frequency of the Doppler shift due to the velocity of the moving platform becomes zero. After the frequency shifting, the radar echo is filtered to separate the radar echoes of the moving and stationary objects from each other. The radar echoes of the moving and stationary objects are respectively subjected to Fourier transform with respect to the distance between the moving platform and the objects. The spectrum of the radar echo from the moving object is further shifted such that the center frequency of the Doppler shift due to the velocity of the object becomes zero. These reception, pulse compression, frequency shift and Fourier transform are executed for each reception beam. The spectrums in the radar echoes of the moving and stationary objects are respectively synthesized for all the reception beams. After the synthesization, the spectrums are respectively multiplied by a reference spectrum in the complex manner. The results of the multiplication are respectively inverse transformed from the spectrums.

25 Claims, 5 Drawing Sheets

SYNTHETIC APERTURE RADAR SYSTEM

BACKGROUND OF THE INVENTION

1. Field of the Invention

The present invention relates to a synthetic aperture radar system utilizing the Doppler effect caused by the movement of a radar platform to improve the cross-range resolution. The present invention particularly concerns improvements in the capacity of such a synthetic aperture radar system for detecting a moving object.

2. Description of the Related Art

FIG. 4 is a block diagram of a synthetic aperture radar system disclosed in Donald R. Wehner, "High Resolution radar", Artech House, Section 6. More particularly, this synthetic aperture radar system is constructed by modifying such a structure as described in the above publication on page 260 and shown in FIG. 6.41, according to the description of the same publication.

The synthetic aperture radar system is adapted to detect an object by the use of a single antenna beam and includes means for transmitting radio waves. The transmitting means comprises a transmitter 1, a circulator 2 and an antenna 3. The transmitter 1 generates radio waves modulated by pulse signals. The circulator 2 functions as a transmission/reception changeover circuit for supplying the output of the transmitter 1 to the antenna 3 and for supplying the output of the antenna 3 to a receiver 4. When the antenna 3 receives the radio waves from the transmitter 1 through the circulator 2, the antenna 3 radiates the radio waves. Since the radio waves have been modulated by the pulse signals, the synthetic aperture radar system will radiate the radio waves with a repetition interval determined by the pulse signals.

The radio waves radiated from the antenna 3 are reflected by the objects, earth, sea and so on. The reflected radio waves, that is, echoes are inputted in the receiver 4 through the circulator 2. The receiver 4 amplifies the received radio waves before they are subjected to phase detection.

On the results from the phase detection, the receiver 4 generates a two-dimensional digital output signal which is represented by a range bin number m and a pulse hit number n. The range bin numbers are applied to the respective transmission timings while the pulse hit numbers represent the positions of the objects and others relating to the creation of the echoes in the reflection. In other words, each of the range bin numbers can specify a transmission timing or azimuth while each of the pulse hit numbers determines a range between the synthetic aperture radar system and an object or the like.

The post-stage of the receiver 4 is connected to a pulse compression unit 5 which performs a pulse compression to the two-dimensional digital signals from the receiver 4 on their correlation along the direction of range bin. Such a process improves the range resolution in the synthetic aperture radar system.

The post-stage of the pulse compression unit 5 includes a circuit for improving the cross-range resolution of the synthetic aperture radar system. This circuit comprises Fourier transform units 6A and 6B, a reference signal generator 7, a complex multiplication unit 8 and an inverse Fourier transform unit 9.

One of the Fourier transform units 6A Fourier-transforms the output of the pulse compression unit 5 for the pulse hit numbers n. The other Fourier transform unit 6B Fourier-transforms the output of the reference signal generator 7. The complex multiplication unit 8 multiplies the output of the Fourier transform unit 6A by the output of the Fourier-transform unit 6B to form complex data. The complex data is then inversely Fourier-transformed by the inverse Fourier transform unit 9. Thus, the cross-range resolution can be improved.

After the signals have been improved in range resolution and cross-range resolution, they are then provided to a square-law detection unit 10. The signals are subjected to square-law detection in the square-law detection unit 10. The square-law detection determines an electric power corresponding to each pixel in the screen of a display unit 11. The square-law detection unit 10 outputs the results to the display unit 11. As a result, the screen of the display unit 11 displays radar images representing the positions, distances, azimuths and the like of the object and others around the radar system.

In such an arrangement, the range resolution is determined by the band width of transmitted pulse signals. The cross-range resolution is determined as follows:

It is now assumed that the radar system is mounted in a moving platform such as aircraft or the like. It is further assumed that this moving platform moves straight at a velocity V as shown in FIG. 5 and that radio waves are radiated in a direction substantially perpendicular to the direction of movement of the platform. It is still further assumed that the transmitted radio waves are reflected by a stationary object such as the ground.

In such a case, the distance R(t) between the moving platform and the object can be represented by the following equation (1):

$$R(t) = R_0 - Vt \cos\theta_0 + V^2 \sin^2\theta_0 t^2 / (2R_0) \tag{1}$$

where $R_0$ is equal to $R(0)$ and $\theta_0$ is an expected angle of the object at time $t=0$, which angle is a reference in the direction of advance.

When the moving platform moves relative to the stationary object, Doppler effect is created. An instantaneous value in the Doppler frequency, that is, instantaneous Doppler frequency $f_d(t)$ is represented by the use of a transmission wavelength λ from an equation (2). If the synthetic aperture time is T, the band width B of the Doppler frequency and the cross-range resolution Δr are represented by equations (3) and (4), respectively.

$$f_d(t) = 2/\lambda (V\cos\theta_0 - V^2 \sin^2\theta_0 t/R_0) \tag{2}$$

$$B = f_d(-T/2) - f_d(T/2) \tag{3}$$

$$\Delta r = V\sin\theta_0 / B = \lambda R_0 / 2VT \sin\theta_0 \tag{4}$$

A synthetic aperture radar for observing a continuous field of view has the maximum resolution when the value $\theta_0$ is equal to 90 [deg]. In the normal operation, such a setting is selected. Since the synthetic aperture time T is given by an antenna beam width $\theta_B$ from an equation (5), the band width B of the Doppler frequency and the cross-range resolution Δr are given by equations (6) and (7):

$$T = R_0 \theta_B / V \tag{5}$$

$$B = 2V\theta_B/\lambda = V/\Delta r \tag{6}$$

$$\Delta r = \lambda/2\theta_B = B/\dot{B} \qquad (7)$$

When such a synthetic aperture radar is to be used to detect and image an object moving on the ground or sea, the band width of the Doppler frequency in the radar echo from the moving object is consistent with the reflected waves from the stationary object, but different in center frequency from that of the reflected waves. If the spectrums of the radar echo from the stationary and moving objects can be separated from each other in the frequency domain as shown in FIG. 6, the moving object can easily be detected and imaged. On the contrary, if the two spectrums are over-lapped on each other as shown in FIG. 7, it is difficult to detect and image the moving object. The overlap of the two spectrums is created when the velocity of the moving object is too low. In order to separate the spectrums from each other, it is therefore required to reduce the band width B of the Doppler frequency. Alternatively, it is required to increase the velocity of the moving object to be detected and to abandon the detection of an object moving at lower velocities. If the band width B of the Doppler frequency is decreased, it is noted that the cross-range resolution $\Delta r$ is degraded as will be apparent from the equation (7).

SUMMARY OF THE INVENTION

It is an object of the present invention to provide a synthetic aperture radar system which can detect a low-speed moving object without degradation of the cross-range resolution. Another object of the present invention is to enable the low-speed moving object to display without positional error. Still another object of the present invention is to accomplish the above objects without reduction of the transmission antenna gain.

To this end, the present invention provides a synthetic aperture radar system mounted on a moving platform, comprising:

a) a multi-beam antenna having a plurality of reception beams different in direction from one another, the width of each of said reception beams being set such that the band width of the Doppler shift contained in the radar echo from a moving object is broader than that in the radar echo from a stationary object; and b) means for improving the cross-range resolution of said radar system, said cross-range resolution improving means comprising:

b1) moving object echo separating means for separating the radar echo of the moving object from the radar echo of the stationary object in radar echoes acquired by the multi-beam antenna for each reception beam;

b2) moving object spectrum transforming means for transforming the radar echo from the moving object into a spectrum relating to the distance between the moving platform and the moving object for each reception beam;

b3) moving object spectrum synthesizing means for synthesizing spectrums obtained by the moving object spectrum transforming means for respective reception beams;

b4) reference spectrum generating means for generating a predetermined reference spectrum;

b5) moving object side multiplying means for multiplying the spectrum synthesized by said moving object spectrum synthesizing means by the reference spectrum; and b6) moving object spectrum inverse transform means for inversely transforming the results of multipication by said moving object side multiplying means from the spectrum.

In the present invention, the multi-beam antenna is used as a reception antenna (or transmission/reception antenna). The antenna has a plurality of reception beams different in direction from one another. Further, the width of each of the reception beams is set to be relatively narrow. More particularly, the band width of the Doppler shift contained in the radar echo from the moving object is set to be broader than that in the radar echo from the stationary object. The radar echo acquired by each of the reception beam is normally in the form of a radio wave. In this case, the radar echo is transformed into the form of digital data.

In such an arrangement, a filtering enables the separation between the stationary and moving objects. More particularly, since the band width of the Doppler frequency is reduced by narrowing the width of each of the reception beams, the radar echo from the moving object can be separated from the radar echo from the stationary object in the radar echoes acquired by the multi-beam antenna. The resulting radar echo of the moving object is transformed into a spectrum relating to the distance between the moving platform and the moving object, for example, by Fourier transform.

The separation between the stationary and moving objects and the transform to the spectrum are carried out for each reception beam. Thus, the spectrum of the radar echo from the moving object can be obtained for each reception beam. The present invention synthesizes such spectrums. After the synthesization, the synthesized spectrum is multiplied by the reference spectrum, with the result thereof being then subjected to inverse transform.

By synthesizing the spectrum in such a manner, the apparent reception beam width is enlarged into the total width of the actual reception beams. This means that the cross-range resolution can remarkably be improved irrespective of the actual narrowed width of each of the reception beams (see the above equation (6)).

Consequently, the present invention can detect a low-speed moving object without degradation of the cross-range resolution.

Preferably, the radar system of the present invention is constructed such that the radar echo of the stationary object separated from that of the moving object will also be subjected to the spectrum transform, spectrum synthesization, multiplication and inverse spectrum transform for each reception beam. The radar system of the present invention can include a range resolution improving means. Since the radar system of the present invention includes a plurality of such reception beams, a plurality of such range resolution improving means may be provided corresponding to the number of the reception beams. The range resolution improving means may be means for compressing the radar echo in the direction of distance.

The example procedure of separating the radar echo of the moving object from that of the stationary object is as follows: First of all, the frequency of the radar echo acquired by the multi-beam antenna is shifted, for reception beam, depending on the center frequency of the Doppler shift contained in the echo of the stationary object. This removes the Doppler shift due to the velocity of the moving platform from the radar echo. Thus, the radar echo will be transformed into a relatively low frequency. When the radar echo for each reception beam is high-pass filtered after the frequency shifting, the radar echo of the moving object having its frequency higher than that of the radar echo of the stationary object is extracted from each reception beam. If the radar echo for each reception beam is low-pass filtered after the frequency shifting, the radar echo of the stationary object having its frequency lower than that of the radar echo of the moving object will be extracted for each reception beam.

The radar echo of the stationary object thus separated is preferably resampled to reduce the amount of data. After the resampling, the radar echo of the stationary object is transformed into a spectrum. The radar echo of the moving object is transformed into a spectrum relating to the distance before it is subjected to velocity compensation. The velocity compensation shifts the frequency of the spectrum from the radar echo of the moving object, depending on the center frequency of the Doppler shift contained in the echo of the moving object. Thus, the Doppler shift due to the velocity and particularly radial velocity of the moving object will be negated.

After the synthesization of spectrum, the radar echoes of the moving and stationary objects are multiplied by the respective reference spectrums. The reference spectrums can be obtained from reference signal generating means and reference signal spectrum transforming means, all of which are common to these reference spectrums. The reference signal generating means generates predetermined reference signals which in turn are transformed into spectrums relating to the distance between the moving platform and the object by the reference signal/spectrum transforming means. This spectrum transform may be Fourier transform for the distance between the moving platform and the object.

The result of inverse transform from the moving object spectrum inverse transform means is transformed as into information suitable for use in display, such information being then used to display information relating to the moving object. This enables the display of the low-speed moving object without positional error. The procedure may similarly be applied to the stationary object.

Further, the information relating to the display may be synthesized and displayed according to the present invention. Namely, the moving and stationary objects can be displayed on one and the same screen. In such a case, the advantage of the present invention relating to the display without positional error can remarkably be provided.

If there is used a transmission antenna having a transmission beam width which covers a plurality of reception beams of the multi-beam antenna, a transmitter generates a radio wave modulated by pulses, which wave is then supplied to the transmission antenna. At this time, the radio wave is transmitted by the broad transmission beam and the plurality of reception beams simultaneously acquire the radar echoes.

The prevention of reduction of the transmission antenna gain, which is the third object of the present invention, can be attained by a time-sharing narrow beam transmission. More particularly, the multi-beam antenna is used not only the reception but also the transmission while a plurality of transmission beams are provided each corresponding to the respective one of the reception beams. When transmitting, one of transmission beams is suitably selected and the corresponding one of the reception beams will receive the echo. In such a manner, the transmission antenna gain can be assured.

The present invention also provides a synthetic aperture radar system mounted in a moving platform, comprising:

a) a multi-beam antenna having a plurality of reception beams different in direction from one another, the width of each of said reception beams being set such that the band width of the Doppler shift contained in the radar echo from a moving object is broader than that in the radar echo from a stationary object;

b) a plurality of moving object spectrum extracting means each provided corresponding to the respective one of said reception beams, each of said moving object spectrum extracting means being adapted to extract the radar echo of the moving object from radar echoes acquired by the corresponding reception beam; and c) moving object spectrum synthesizing means for synthesizing the radar echoes of the moving object extracted by each of said moving object spectrum extracting means into a spectrum, d) whereby each of said moving object spectrum extracting means extracts the radar echo of the moving object from radar echoes acquired by the corresponding reception beam, utilizing the fact that the band width of the Doppler shift contained in the radar echo of the moving object is broader than that of the Doppler shift contained in the radar echo of the stationary object.

The present invention further provides a synthetic aperture radar system mounted in a moving platform, comprising:

a) a multi-beam antenna having a plurality of reception beams different in direction from one another, the width of each of said reception beams being set such that the band width of the Doppler shift contained in the radar echo from a moving object is broader than that in the radar echo from a stationary object;

b) a plurality of moving object spectrum extracting means each provided corresponding to the respective one of said reception beams, each of said moving object spectrum extracting means being adapted to extract the radar echo of the moving object from radar echoes acquired by the corresponding reception beam;

c) a plurality of stationary object spectrum extracting means each provided corresponding to the respective one of said reception beams, each of said stationary object spectrum extracting means being adapted to extract the radar echo of the stationary object from the radar echoes acquired by the corresponding reception beam;

d) moving object spectrum synthesizing means for synthesizing the radar echoes of the moving object extracted by each of said moving object spectrum extracting means into a spectrum; and e) stationary object spectrum synthesizing means for synthesizing the radar echoes of the stationary object extracted by each of said stationary object spectrum extracting means into a spectrum, f) whereby each of said moving and stationary object spectrum extracting means extracts the radar echo of the moving or stationary object from radar echoes acquired by the corresponding reception beam, utilizing the fact that the band width of the Doppler shift contained in the radar echo of the moving object is broader than that of the Doppler shift contained in the radar echo of the stationary object.

The cross-range resolution improving device of the present invention is used in a synthetic aperture radar system mounted in a moving platform and comprises:

a) moving object echo separating means for separating the radar echo of a moving object from radar echoes acquired by a multi-beam antenna having a plurality of reception beams different in direction from one another for each reception beam, the width of each of said reception beams being set such that the band width of the Doppler shift contained in the radar echo of the moving object is broader than that of the Doppler shift contained in the radar echo of the stationary object;

b) moving object spectrum transforming means for transforming the radar echo of the moving object into a spectrum relating to the distance between the moving platform and the object for each reception beam;

c) moving object spectrum synthesizing means for synthesizing the spectrum obtained by said moving object spectrum transforming means;

d) reference spectrum generating means for generating a predetermined reference spectrum;

e) moving object side multiplying means for multiplying the spectrum synthesized by said moving object spectrum synthesizing means by the reference spectrum; and f) moving object spectrum inverse transform means for inverse transforming the result of multiplication of said moving object side multiplying means from the spectrum.

The present invention further provides a synthetic aperture radar system mounted in a moving platform, comprising:

a) a multi-beam antenna having a plurality of reception beams different in direction from one another, the width of each of said reception beams being set such that the band width of the Doppler shift contained in the radar echo from a moving object is broader than that in the radar echo from a stationary object; and b) means for improving the cross-range resolution of said radar system, said cross-range resolution improving means comprising:

b1) stationary object echo separating means for separating the radar echo of the stationary object from radar echoes acquired by the multi-beam antenna for each reception beam;

b2) stationary object spectrum transforming means for transforming the radar echo of the stationary object into a spectrum relating to the distance between the stationary platform and the object for each reception beam;

b3) stationary object spectrum synthesizing means for synthesizing a spectrum obtained by the stationary object spectrum transforming means;

b4) reference spectrum generating means for generating a predetermined reference spectrum;

b5) stationary object side multiplying means for multiplying the spectrum synthesized by said stationary object spectrum synthesizing means by the reference spectrum; and b6) stationary object spectrum inverse transform means for inversely transforming the results of multiplication of said stationary object side multiplying means from the spectrum.

DETAILED DESCRIPTION OF THE PREFERRED EMBODIMENTS

Some preferred embodiments of the present invention will now be described with reference to the drawings.

First Embodiment

Figure 1:
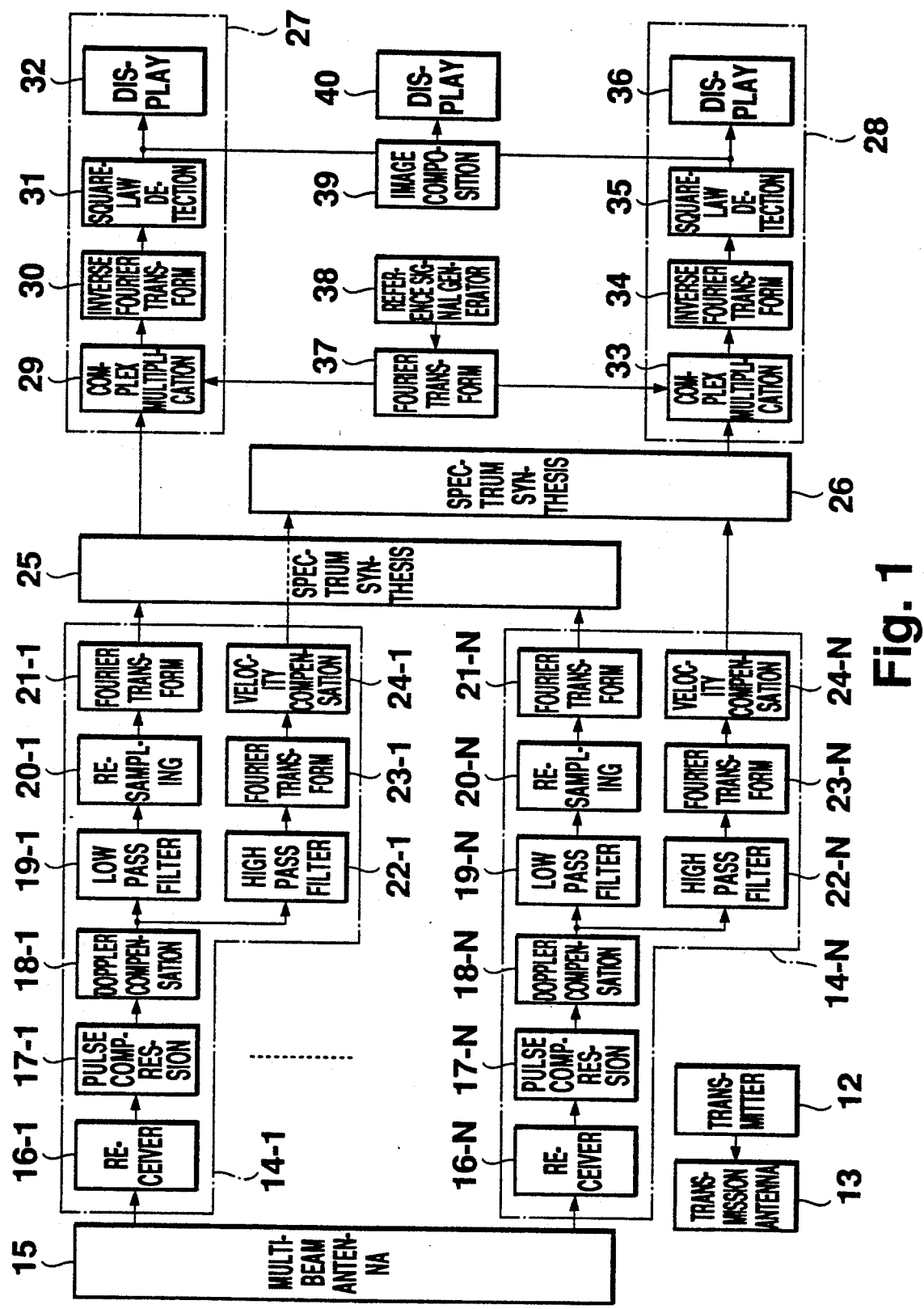
FIG. 1 is a block diagram of a first embodiment of a synthetic aperture radar system constructed in accordance with the present invention.

FIG. 1 shows the first embodiment of a synthetic aperture radar system constructed in accordance with the present invention, which comprises a transmitter 1 for transmitting radio waves and a transmission antenna 13. The transmitter 1 generates radio waves modulated by pulse signals. The transmission antenna 13 radiates the modulated radio waves.

Figure 2:
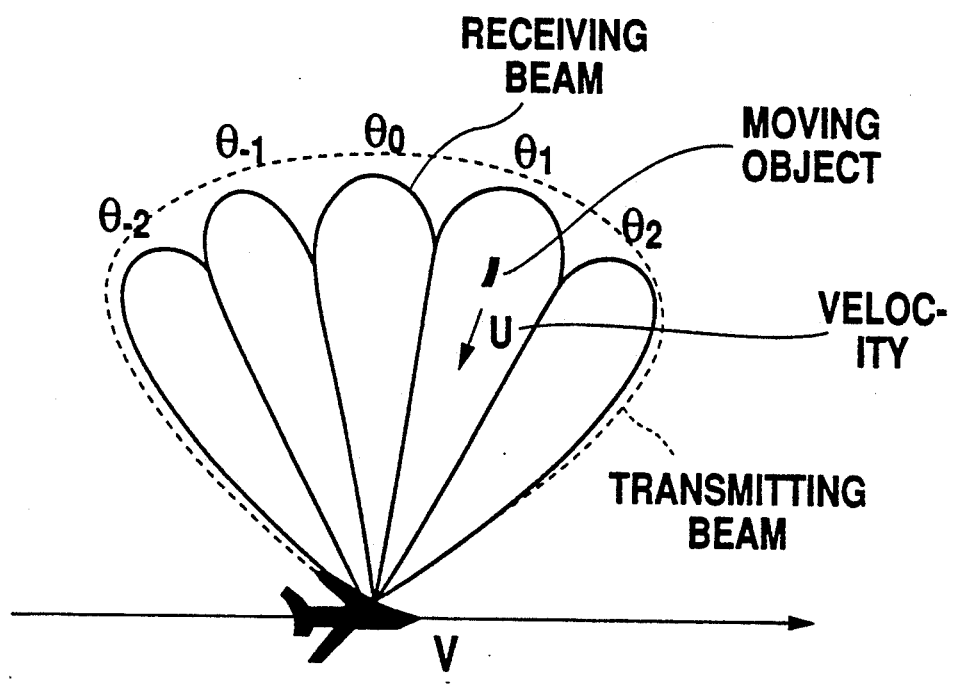
FIG. 2 is a view showing the relationship between the transmission beam and the reception beams in the first embodiment of FIG. 1.

The transmission beam of the transmission antenna 13 is set to include all beams formed by a multi-beam antenna 15, as shown in FIG. 2. The multi-beam antenna 15 functions to receive the radio waves (i.e. echoes) reflected by the object or the like and has a plurality of beams as shown in FIG. 2. The width $\theta_B$ of each of the beams (reception beams) in the multi-beam antenna 15 is set to satisfy the following relationship:

$$2U/\lambda > 2V\theta_B/\lambda \tag{8}$$

where V is the velocity of a radar platform and U is the radial velocity of an object. By setting the beam width $\theta_B$ under such a condition, a moving object can be distinguished from a stationary object.

As described in connection with the equation (6), the radar echo from the stationary object contains a Doppler shift having its band width of $2V\theta_B/\lambda$. This Doppler shift is exclusively produced from the movement of the radar platform.

The radar echo from the moving object futher contains a Doppler shift having a band width of $2U/\lambda$. The Doppler shift is exclusively produced by the movement of the object.

When the above relationship (8) is valid, i.e when the band width of the Doppler shift caused by the velocity U is broader than that of the Doppler shift caused by the velocity V, both the Doppler shifts can be separated from each other by filtering the output of the multi-beam antenna 15.

The post-stage of the multi-beam antenna 15 includes a circuit for separating the Doppler shifts respectively having velocities V and U from each other. More particularly, the post-stage of the multi-beam antenna 15 includes a plurality of signal processing subsystems 14-1, . . . 14-N for each antenna beam.

Each of the signal processing subsystems 14-i (where i=1, 2, . . . N) comprises a receiver 16-i, a pulse compression unit 17-i, a Doppler compensation unit 18-i, a low pass filter 19-i, a resampling unit 20-i, a Fourier transform unit 21-i, a high pass filter 22-i, a Fourier transform unit 23-i and a velocity compensation unit 24-i.

The receiver 16-i amplifies the reception signal which is received by the corresponding beam of the multibeam antenna 15, with the amplified signal being then subjected to phase detection. The receiver 16-i generates a two-dimensional digital signal from the result of the phase detection. The two-dimensional digital signal is represented by a range bin number m and a pulse hit number n. The pulse compression unit 17-i pulse compresses the two-dimensional digital signal from the receiver 16-i on the correlation along the direction of range bin. This improves the range resolution.

When it is now assumed that the main lobe direction of a reception beam is $\theta_i$, the center value of an instantaneous Doppler frequency, that is, a Doppler frequency of the radar echo coming from the direction $\theta_i$ becomes $2V \sin \theta_i \lambda$, as will be apparent from the equation (2). The Doppler compensation unit 18-i shifts the frequency in the output of the pulse compression unit 17-i such that the Doppler frequency in the radar echo coming from the direction $\theta_i$ becomes zero. By such a processing, that is, by the compensation of the Doppler frequency, the central value of the Doppler frequency in the echo from the stationary object can be handled as if it is zero. In other words, the center value of the Doppler shift due to the velocity V of the radar platform can be compensated into zero by the Doppler compensation unit 18-i.

The low pass filter 19-i takes out only the radar echo of the stationary object by permitting only predetermined low-frequency components in the output of the Doppler compensation unit 18-i to pass therethrough. Thus, the band width of the output of the low pass filter 19-i is narrowed. In order to thin out data, the resampling unit 20-i samples the output of the low pass filter 190-i. The Fourier transform unit 21-i causes the output of the resampling unit 20-i, i.e. data thinned by the sampling to be subjected to Fourier transform.

The high pass filter 22-i takes out only the radar echo of the moving object by permitting only predetermined high-frequency components in the output of the Doppler compensation unit 18-i to pass therethrough. The Fourier transform unit 23-i causes the output of the high pass filter 22-i to be subjected to Fourier transform. The output of the Fourier transform unit 23-i contains a Doppler shift due to the velocity U. The velocity compensation unit 24-i removes the Doppler shift due to the radial velocity U of the object from the output of the Fourier transform unit 23-i. Thus, the moving object can be displayed without positional error on the screen.

In such a manner, the Fourier transform unit 21-i of each of the signal processing subsystems outputs a spectrum relating to the radar echo of the stationary object while the velocity compensation unit 24-i outputs a spectrum relating to the radar echo of the moving object. The spectrum synthesizing unit 25 shown in FIG. 1 synthesizes spectrums relating to the radar echoes of the stationary objects while the other spectrum synthesizing unit 26 synthesizes spectrums relating to the radar echoes of the moving objects. By synthesizing these spectrums, the band widths of the radar echoes from the stationary and moving objects will be expanded by the number of reception beams equal to N.

The post-stage of the spectrum synthesizing unit 25 is connected to a processing and display subsystem 27 while the post-stage of the spectrum synthesizing unit 26 is connected to a processing and display subsystems 28. The processing and display subsystem 27 comprises a complex multiplication unit 29, an inverse Fourier transform unit 30, a square-law detection unit 31 and a display unit 32. Similarly, the processing and display subsystem 28 comprises a complex multiplication unit 33, an inverse Fourier transform unit 34, a square-law detection unit 35 and a display unit 36.

Each of the complex multiplication units 29 and 33 causes the output of the spectrum synthesizing unit 25 or 26 to be multiplied by the output of the Fourier transform unit 37 in the complex manner. The Fourier transform unit 37 causes the output of a reference signal generator 38 to be subjected to Fourier transform. Each of the inverse Fourier transform units 30 and 34 causes the result of the complex multiplication unit 29 or 33 to be subjected to inverse Fourier transform, the transformed output thereof being then provided to the respective one of the square-law detection units 31 and 35. Each of the square-law detection units 31 and 35 cause the output of the inverse Fourier transform unit 30 or 34 to be subjected to square-law detection.

Figure 4:
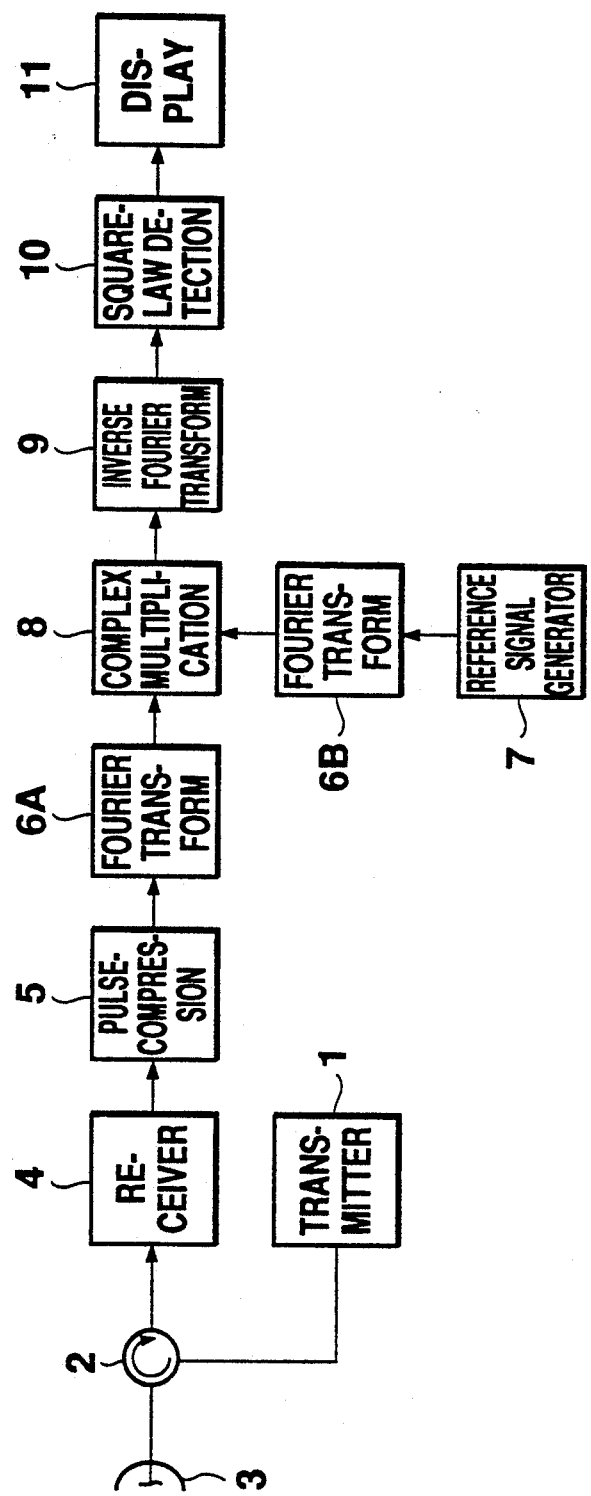
FIG. 4 is a block diagram showing the arrangement of a synthetic aperture radar system constructed in accordance with the prior art.
Figure 5:
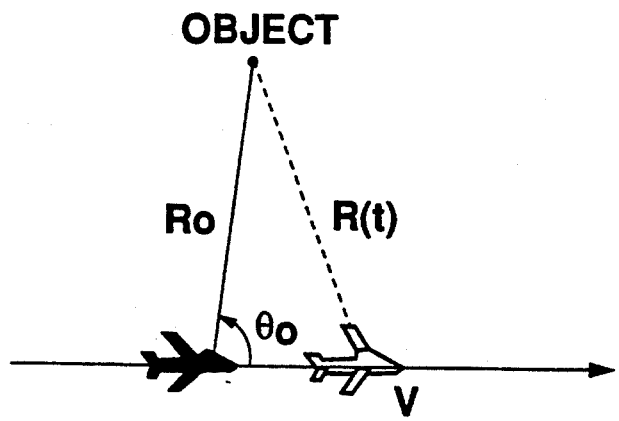
FIG. 5 is a view showing the positional relationship between the radar platform and an object.
Figure 6:
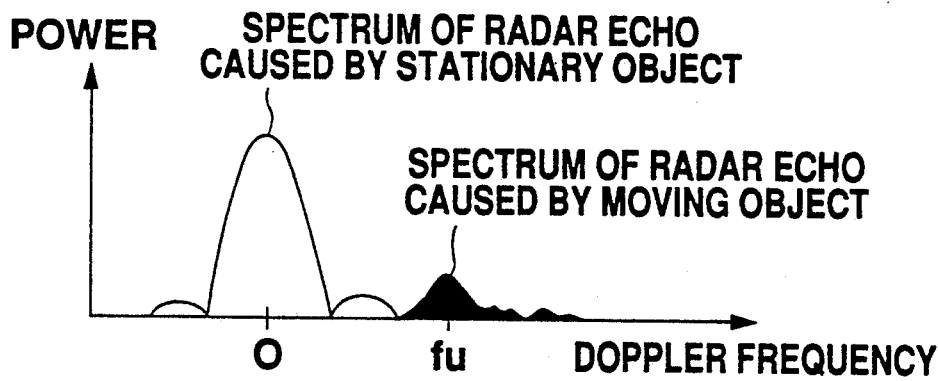
FIG. 6 is a view showing the separation between the spectrums in the radar echo of the stationary and moving objects.
Figure 7:
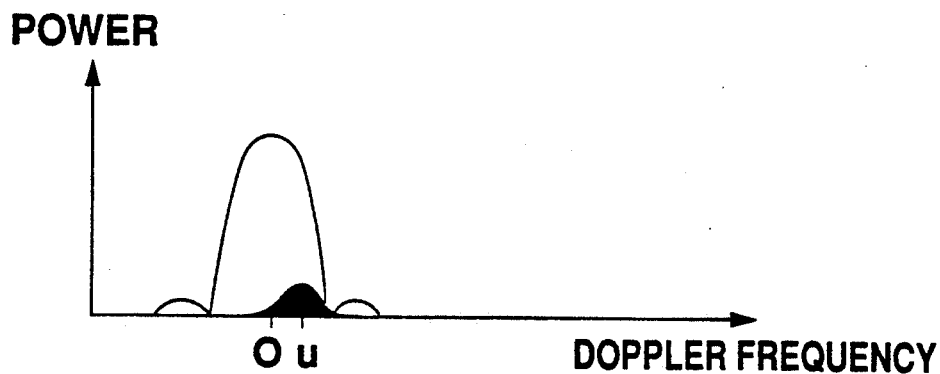
FIG. 7 is a view showing the overlap between the spectrums in the radar echoes of the stationary and moving objects.

In such a manner, it can be said that the processing and display subsystems 27 and 28 improve, with the Fourier transform unit 37 and reference signal generator, the cross-range resolution in accordance with the same principle as in the prior art shown in FIG. 4. However, the first embodiment of the present invention is different from the prior art in that the processing and display subsystems 27 and 28 receive the spectrums obtained by synthesizing the spectrums relating to the reception beams of N in number. In the first embodiment, thus, the cross-range resolution can be improved as though the beam width $\theta_B$ is enlarged N times. In the first embodiment, further, the spectrums relating to the stationary and moving objects are separated from each other before they are subjected to such a processing operation. By supplying a square-law detected signal to the respective one of the separate display units 32 and 36, the echoes of the stationary and moving objects can separately be displayed. Furthermore, the echoes of the stationary and moving objects can simultaneously be displayed on the screen of the display unit 40 by synthesizing the square-law detected signals at an image composition unit 39.

In such a manner, the first embodiment of the present invention can detect any low-speed moving object without degradation of the cross-range resolution. The echo of the detected object can be displayed without positional error.

Second Embodiment

Figure 3:
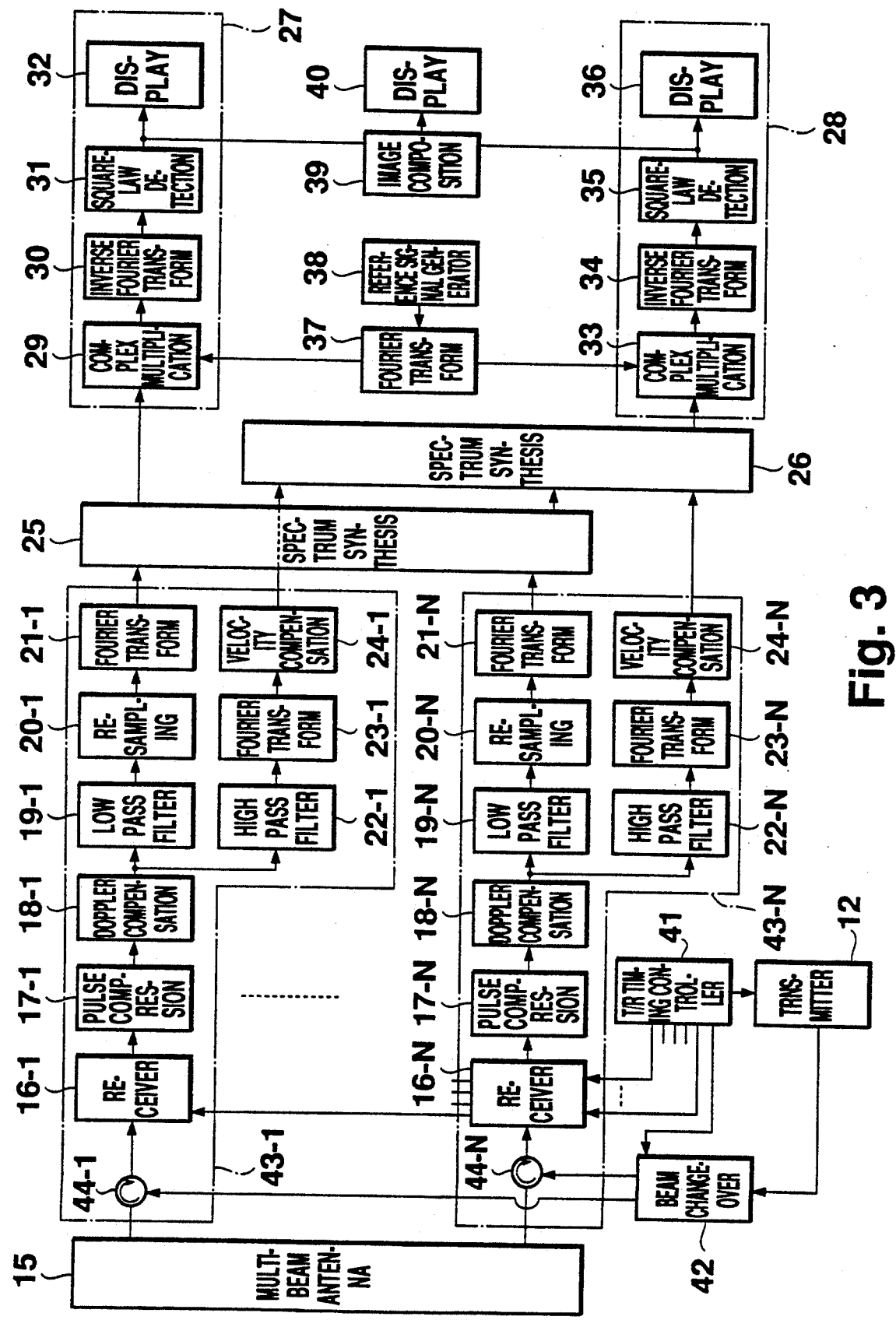
FIG. 3 is a block diagram of a second embodiment of a synthetic aperture radar system constructed in accordance with the present invention.

FIG. 3 shows the second embodiment of a synthetic aperture radar system constructed in accordance with the present invention. The second embodiment is obtained by improving the first embodiment and can prevent the transmission antenna gain and associated signal to noise power ratio of image from being reduced. In the following description, parts similar to those of the first embodiment are denoted by similar reference numerals and will not be further described herein.

The second embodiment comprises a T/R timing controller 41 and a transmission beam changeover circuit 42. Each signal processing subsystem 43-i (where i=1, 2, ... N) is defined by the pre-stage of a corresponding signal processing subsystem 14-i further including a circulator 44-i.

The T/R timing controller 41 informs a transmission timing to the transmitter 12, receiver 16-i and transmission beam changeover circuit 42. The transmitter 12 is responsive to this signal to generate radio waves to be transmitted. The transmission beam changeover circuit 42 supplies the generated wave to the multi-beam antenna 15 through the circulator 44-i at a time interval corresponding to the width of transmission pulse, in synchronism with the transmission timing from the T/R timing controller 41. Only when the receiver 16-i receives the transmission timing from the T/R timing controller 41, the receiver 16-i executes the reception processing operation. The multi-beam antenna 15 performs the transmission and reception with a narrow beam corresponding to the receiver 16-i performing its reception processing operation. Therefore, each of the reception beams is used in a time sharing manner.

In such a manner, the second embodiment can prevent the transmission antenna gain and associated signal to noise power ratio of image from being reduced since the narrow beam transmission is carried out in the time sharing manner.

What is claimed is:

1. A synthetic aperture radar system mounted in a moving platform, comprising:
   a multi-beam antenna having a plurality of reception beams different in direction from one another, the width of each of said reception beams being set such that the band width of the Doppler shift contained in the radar echo from a moving object is broader than that in the radar echo from a stationary object; and
   means for improving the cross-range resolution of said radar system, said cross-range resolution improving means comprising:
   moving object echo separating means for separating the radar echo of the moving object from the radar echo of the stationary object in radar echoes acquired by the multi-beam antenna for each reception beam;
   moving object spectrum transforming means for transforming the radar echo from the moving object into a spectrum relating to the distance between the moving platform and the moving object for each reception beam;
   moving object spectrum synthesizing means for synthesizing a spectrum obtained by the moving object spectrum transforming means;
   reference spectrum generating means for generating a predetermined reference spectrum;
   moving object side multiplying means for multiplying the spectrum synthesized by said moving object spectrum synthesizing means by the reference spectrum; and
   moving object spectrum inverse transform means for inversely transforming the results of said moving object side multiplying means from the spectrum.

2. A synthetic aperture radar system as defined in claim 1, further comprising a plurality of receiver means each provided to one of said reception beams and adapted to radio waves in the radar echo acquired by the corresponding reception beam into the form of digital data.

3. A synthetic aperture radar system as defined in claim 1, further a plurality of range resolution improving means each provided to one of said reception beams and adapted to compress the band width of the radar echo acquired by the corresponding reception beam along the direction of distance to improve the range resolution of said radar system.

4. A synthetic aperture radar system as defined in claim 1 wherein said moving object echo separating means includes a moving object extracting filter for filtering the radar echo acquired by said multi-beam antenna to extract the radar echo of the moving object for each reception beam.

5. A synthetic aperture radar system as defined in claim 4 wherein said moving object echo separating means includes frequency shifting means for shifting and transforming the frequency of the radar echo acquired by said multi-beam antenna into relatively low frequency components on the center frequency of a Doppler shift contained in the echo of said stationary object for each reception beam and wherein said moving object extracting filter is adapted to high pass filtrate the radar echo subjected to the frequency shift by said frequency shifting means for each reception beam.

6. A synthetic aperture radar system as defined in claim 1 wherein said cross-range resolution improving means includes velocity compensation means for shifting the frequency of a spectrum obtained by said moving object spectrum transforming means on the center frequency of the Doppler shift contained in the echo of the moving object and for compensating said Doppler shift to form a spectrum supplied to said moving object spectrum synthesizing means.

7. A synthetic aperture radar system as defined in claim 1 wherein said moving object spectrum transforming means causes the radar echo of the moving object to be subjected to Fourier transform with respect to the distance between the moving platform and the object for each reception beam.

8. A synthetic aperture radar system as defined in claim 1 wherein said reference spectrum generator means includes:
   reference signal generator means for generating a predetermined reference signal; and
   reference signal spectrum transforming means for transforming the reference signal to a spectrum relating to the distance between the moving platform and the object.

9. A synthetic aperture radar system as defined in claim 8 wherein said reference signal spectrum transforming means causes the reference signal to be subjected to Fourier transform with respect to the distance between the moving platform and the object.

10. A synthetic aperture radar system as defined in claim 1, further comprising:
    moving object image transforming means for transforming the result of said moving object spectrum inverse transform means into information suitable for use in display; and
    moving object display means for displaying information relating to the moving object based on the information from said moving object image transforming means.

11. A synthetic aperture radar system as defined in claim 1 wherein said cross-range resolution improving means further comprises:
    stationary object echo separating means for separating the radar echo of the stationary object from the radar echo of the moving object in radar echoes acquired by said multi-beam antenna for each reception beam;

stationary object spectrum transforming means for transforming the radar echo of the stationary object into a spectrum relating to the distance between the moving platform and the object for each reception beam;

stationary object spectrum synthesizing means for synthesizing the spectrums obtained by said stationary object spectrum transforming means;

stationary object side multiplication means for multiplying the spectrum synthesized by said stationary object spectrum synthesizing means by the reference spectrum; and stationary object spectrum inverse transforming means for inverse transforming the result of said stationary object side multiplication means from the spectrum.

12. A synthetic aperture radar system as defined in claim 11, further a plurality of range resolution improving means each provided to one of said reception beams and adapted to compress the band width of the radar echo acquired by the corresponding reception beam along the direction of distance to improve the range resolution of said radar system.

13. A synthetic aperture radar system as defined in claim 11, wherein said stationary object echo separating means includes a stationary object extracting filter for filtering the radar echo acquired by said multi-beam antenna to extract the radar echo of the stationary object for each reception beam.

14. A synthetic aperture radar system as defined in claim 11 wherein said stationary object echo separating means includes frequency shifting means for shifting and transforming the frequency of the radar echo acquired by said multi-beam antenna into relatively low frequency components on the center frequency of a Doppler shift contained in the echo of said stationary object for each reception beam and wherein said stationary object extracting filter is adapted to low pass filtrate the radar echo subjected to the frequency shift by said frequency shifting means for each reception beam.

15. A synthetic aperture radar system as defined in claim 11 wherein said cross-range resolution improving means further includes sampling means for sampling the radar echo of the stationary object to reduce the amount of data in said radar echo, the reduced radar echo data being then supplied to said stationary object spectrum transforming means.

16. A synthetic aperture radar system as defined in claim 11 wherein said stationary object spectrum transforming means causes the radar echo of the stationary object to be subjected to Fourier transform with respect to the distance between the moving platform and the object for each reception beam.

17. A synthetic aperture radar system as defined in claim 11, further comprising:

stationary object image transforming means for transforming the result of said stationary object spectrum inverse transform means into information suitable for use in display; and stationary object display means for displaying information relating to the stationary object based on the information from said stationary object image transforming means.

18. A synthetic aperture radar system as defined in claim 17, further comprising:

stationary object image transforming means for transforming the result of said stationary object spectrum inverse transform means into information suitable for use in display;

image synthesizing means for synthesizing an image from information obtained both by said moving and stationary object image transforming means; and synthesized image and display means for displaying information relating to the stationary and moving objects in accordance with the synthesized information.

19. A synthetic aperture radar system as defined in claim 1, further comprising transmitter means for transmitting radio waves to be reflected by the surrounding objects in all direction.

20. A synthetic aperture radar system as defined in claim 19, said transmitter means comprising a transmitter for generating radio waves modulated by pulses and a transmission antenna for transmitting the radio wave generated by said transmitter, said transmission antenna has a transmission beam covering all the reception beams.

21. A synthetic aperture radar system as defined in claim 19 wherein said multi-beam antenna has a plurality of transmission beams each provided to one of said reception beams and wherein said transmitter means comprises a transmitter for generating radio waves modulated by pulses; transmission beam selecting means for causing any one of said transmission beams to transmit the radio waves generated by said transmitter; and reception beam selecting means for informing the selection of a transmission beam to said cross-range resolution improving means to specify a reception beam relating to the processing operation.

22. A synthetic aperture radar system mounted in a moving platform, comprising:

a multi-beam antenna having a plurality of reception beams different in direction from one another, the width of each of said reception beams being set such that the band width of the Doppler shift contained in the radar echo from a moving object is broader than that in the radar echo from a stationary object;

a plurality of moving object spectrum extracting means each provided corresponding to the respective one of said reception beams, each of said moving object spectrum extracting means being adapted to extract the radar echo of the moving object from radar echoes acquired by the corresponding reception beam; and moving object spectrum synthesizing means for synthesizing the radar echo of the moving object extracted by each of said moving object spectrum extracting means into a spectrum, whereby each of said moving object spectrum extracting means can extract the radar echo of the moving object from radar echoes acquired by the corresponding reception beam, utilizing the fact that the band width of the Doppler shift contained in the radar echo of the moving object is broader than that of the Doppler shift contained in the radar echo of the stationary object.

23. A synthetic aperture radar system as defined in claim 22, further comprising a plurality of stationary object spectrum extracting means each provided to one of said reception beams and adapted to extract the radar echo of the stationary object from radar echoes acquired by the corresponding reception beam and stationary object spectrum synthesizing means for synthesizing a spectrum from the radar echo of the stationary object extracted by said stationary object spectrum extracting means, whereby each of said stationary object spectrum extracting means can extract the radar echo of the stationary object from radar echoes acquired by the corresponding reception beam, utilizing the fact that the band width of the Doppler shift contained in the radar echo of the stationary object is broader than that of the Doppler shift contained in the radar echo of the moving object.

24. In a synthetic aperture radar system mounted in a moving platform, a cross-range resolution improving device comprising:

moving object echo separating means for separating the radar echo of a moving object from radar echoes acquired by a multi-beam antenna having a plurality of reception beams different in direction from one another for each reception beam, the width of each of said reception beams being set such that the band width of the Doppler shift contained in the radar echo of the moving object is broader than that of the Doppler shift contained in the radar echo of the stationary object;

moving object spectrum transforming means for transforming the radar echo of the moving object into a spectrum relating to the distance between the moving platform and the object for each reception beam;

moving object spectrum synthesizing means for synthesizing the spectrum obtained by said moving object spectrum transforming means;

reference spectrum generating means for generating a predetermined reference spectrum;

moving object side multiplying means for multiplying the spectrum synthesized by said moving object spectrum synthesizing means by the reference spectrum; and moving object spectrum inverse transform means for inverse transforming the result of said moving object side multiplying means from the spectrum.

25. A synthetic aperture radar system mounted in a moving platform, comprising:

a multi-beam antenna having a plurality of reception beams different in direction from one another, the width of each of said reception beams being set such that the band width of the Doppler shift contained in the radar echo from a moving object is broader than that in the radar echo from a stationary object; and means for improving the cross-range resolution of said radar system, said cross-range resolution improving means comprising:

stationary object echo separating means for separating the radar echo of the stationary object from radar echoes acquired by the multi-beam antenna for each reception beam;

stationary object spectrum transforming means for transforming the radar echo of the stationary object into a spectrum relating to the distance between the stationary platform and the object for each reception beam;

stationary object spectrum synthesizing means for synthesizing a spectrum obtained by the stationary object spectrum transforming means;

reference spectrum generating means for generating a predetermined reference spectrum; stationary object side multiplying means for multiplying the spectrum synthesized by said stationary object spectrum synthesizing means by the reference spectrum; and stationary object spectrum inverse transform means for inversely transforming the results of said stationary object side multiplying means from the spectrum.

* * * * *